United States Patent [19]

Zirngibl

[11] Patent Number: 5,088,095
[45] Date of Patent: Feb. 11, 1992

[54] GAIN STABILIZED FIBER AMPLIFIER

[75] Inventor: Martin Zirngibl, Middletown, N.J.

[73] Assignee: AT&T Bell Laboratories, Murray Hill, N.J.

[21] Appl. No.: 648,713

[22] Filed: Jan. 31, 1991

[51] Int. Cl.[5] .......................... H01S 3/13; H01S 3/30
[52] U.S. Cl. ........................... 372/6; 372/25; 372/30; 372/31; 372/94
[58] Field of Search .................. 372/6, 19, 94, 29-32, 372/28, 25; 356/350; 350/96.15, 96.16; 370/3; 455/612, 610

[56] References Cited

U.S. PATENT DOCUMENTS

| | | | |
|---|---|---|---|
| 4,592,043 | 5/1986 | Williams | 370/3 |
| 4,635,263 | 1/1987 | Mollenauer | 372/3 |
| 4,720,160 | 1/1988 | Hicks | 350/96.15 |
| 4,778,238 | 10/1988 | Hicks | 350/96.16 |
| 4,780,876 | 10/1988 | Smith et al. | 372/3 |
| 4,835,778 | 5/1989 | Kafka et al. | 372/6 |
| 4,852,117 | 7/1989 | Po | 372/97 |
| 5,005,175 | 4/1991 | Desurvire et al. | 372/6 |

Primary Examiner—William L. Sikes
Assistant Examiner—Galen J. Hansen
Attorney, Agent, or Firm—Eli Weiss

[57] ABSTRACT

In this invention an optical fiber doped with a rare earth element and coupled to be pumped with a laser is coupled to an optical feedback loop. The feedback loop couples the output signal of the fiber amplifier to the input of the fiber amplifier. A narrow bandwidth filter coupled to the feedback loop allows a selected wavelength of the amplified spontaneous emission to pass from the output of the fiber amplifier to the input of the fiber amplifier. The feedback signal has a wavelength which is different from that of the pump signal and the wavelengths of the signals to be amplified. In operation, when bursts of optical signals from at least two discrete word or frequency division multiplexed channels are amplified in the fiber amplifier, the undesired fluctuations of gain of the output signals normally due to transient saturation of the erbium-doped filter amplifier are substantially eliminated.

9 Claims, 4 Drawing Sheets

FEEDBACK OFF

FEEDBACK ON

GAIN STABILIZED FIBER AMPLIFIER

Technical Field

This invention relates generally to fiber amplifiers and more particularly to erbium-doped fiber amplifiers having improved operating characteristics.

Background of the Invention

There is considerable interest in using rare earth doped fiber amplifiers to amplify weak optical signals for both local and trunk optical communication networks. Rare earth doped optical amplifying fibers have low cost, exhibit low-noise, provide relatively large bandwidth which is not polarization dependent, display substantially reduced crosstalk problems, and present low insertion losses at the relevant operating wavelengths used in optical communications. Contemplated rare earth doped optical fiber amplifiers can be coupled end-to-end to a transmission fiber and transversely coupled, through a directional coupler, to a laser diode pump. The directional coupler is designed to have a high coupling ratio at the pump wavelength and a low coupling ratio at the signal wavelength so that maximum pump energy is coupled to the amplifier with minimal signal loss When the amplifying medium is excited with a laser pump, signal light traversing the amplifier will experience gain. The pump energy can be made to propagate either co-directionally or contra-directionally relative to the signal energy. The direction of propagation depends upon whether any remaining unconverted pump light can be more conveniently filtered at the transmitter or the reciever.

Optical amplifiers are attractive alternative to opto-electronic regenerators in light wave communications systems. They can be used as linear repeaters in long-distance fiber-optic links, as optical preamplifiers in receivers, and as loss compensators in distributed optical networks. Proposed systems disclose the use of erbium-doped optical fiber amplifiers for amplifying high-speed optical data pulse signals in one or two channels. However, when erbium-doped optical fiber amplifiers are used in networking and switching applications which involves at least two amplitude shift keyed or frequency shift keyed channels that are selectively turned on and off, amplification of the packets of the different channels can suffer slow, undesirable gain fluctuations which result from saturation effects in the optical fiber amplifier. Clearly, a need exists for an erbium doped optical amplifier which can provide constant gain of packets of different channels which are selectively turned on and off.

Summary of the Invention

In this invention an optical fiber doped with a rare earth element and coupled to be pumped with an exemplary laser is coupled to an optical feedback loop. The feedback loop couples the output signal of the fiber amplifier to the input of the fiber amplifier. A narrow bandwidth filter coupled to the feedback loops allows a selected wavelength of the amplified spontaneous emission to pass the output of the fiber amplifier to the input of the fiber amplifier. The feedback signal has a wavelength which is different from that of the pump signal and the wavelengths of the signals to be amplified. In operation, when bursts of optical signals from at least two discrete wordlength or frequency division multiplexed channels are amplified in the fiber amplifier, the undesired fluctuations of gain of the output signals normally due to transient saturation of the erbium-doped filter amplifier are substantially eliminated.

Brief Description of the Drawing

FIGS. 3, 4 and 5 illustrate three output spectra corresponding to different signal input powers with the feedback loop signal being turned off and on;

Detailed Description

Erbium-doped fiber amplifiers are now recognized to be important in the field of 1.5 $\mu$m optical fiber communications. One of the key advantages of erbium-doped fiber amplifiers is their immunity to crosstalk, which is due to their inherently slow gain dynamics. It is this characteristic which makes them suitable for use in multichannel wordlength division multiplex (WDM) or frequency division multiplex (FDM) fiber networks. In such applications, however, occasional bursts of traffic, where channels are transmitting simultaneously; can result in gain fluctuations due to transient saturation in the erbium-doped fiber amplifier. This results in packet-to-packet data interferences, whether amplitude shift keyed (ASK) or frequency shift keyed (FSK) modulation format is used. One way to suppress low-frequency crostalk and to stabilize the gain of an erbium-doped fiber amplifier is to use a feed-forward automatic gain control (AGC) loop. A feed-forward AGC loop acts on the pump source to increase the gain when a transient of higher signal power is detected at the fiber amplifier input port. A main disadvantage of using pump power control as a means of AGC is the large pump power change required to compensate for the fluctuation of gain. A second method is to compensate for any variation of signal input by actively counter-modulating the optical power of one of the input channels. Both schemes require the detection of optical power with an electronic circuit and the active modulation of an optical source.

In this invention, a selected wavelength of the amplified spontaneous emission (ASE) at the output of the erbium doped fiber amplifier is fed back to the input via an all-optical and all fiber path; and, therefore, the selected wavelength is reamplified. Thus, ring-lasing occurs at the feedback wavelength and, consequently, the gain in the amplifier is held at a constant value. In operation, the gain of the various channels being amplified by the optical amplifier are maintained at this constant value independently of their input power level to eliminate slow channel to channel interference.

Figure 1:
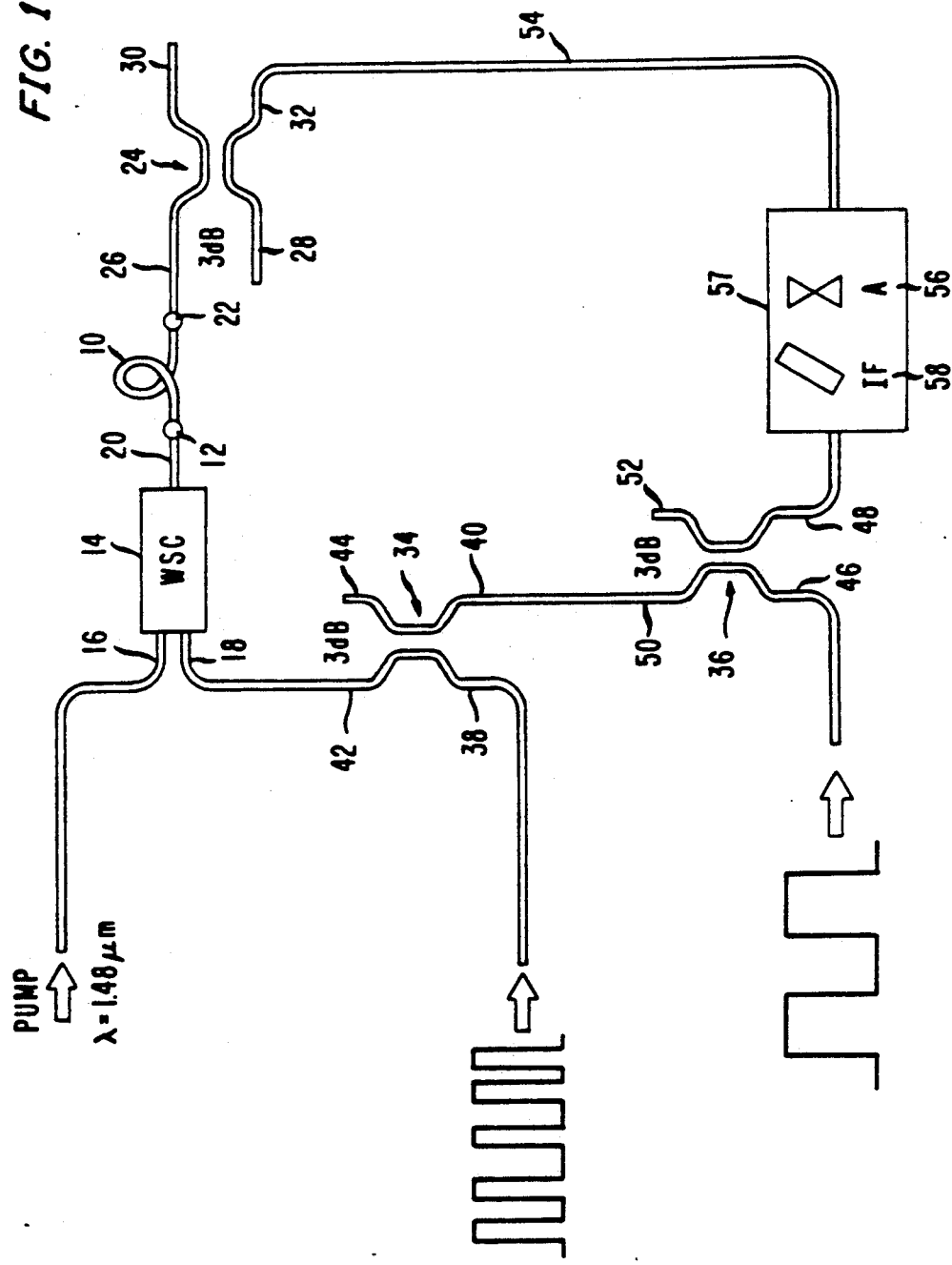
FIG. 1 is a schematic of structure in accordance with the principles of the invention.

Referring to FIG. 1, there is illustrated a feedback scheme in accordance with the principles of the invention. An erbium-doped fiber amplifier 10 is coupled, at one end, via a fusion splice 12 to a wavelength selective coupler 14 having input ports 16, 18 and an output port 20; and at the other end via a fusion splice 22 to a 3 dB coupler 24 having two input ports 26, 28 and output ports 30, 32. The erbium doped fiber amplifier 10 can be pumped by a high power laser diode at a wavelength of 1.48 μm coupled through input port 16 of wavelength selective coupler 14. Two 3 dB couplers 34, 36 which are coupled in tandem provide access for directing multiple input signals to the erbium doped fiber amplifier 10. Coupler 34 supports input ports 38, 40 and output ports 42, 44; and, coupler 36 supports input ports 46, 48 and output ports 50, 52.

Input port 38 of coupler 34 is coupled to receive a first input signal and input port 46 of coupler 36 is coupled to receive a second input signal. Output port 50 of coupler 36 is connected to input port 40 of coupler 34, and, output port 42 of coupler 34 is connected to input port 18 of wavelength selective coupler 14.

The output port 32 of coupler 24 is coupled to the input port 48 of coupler 36 to provide a feedback loop 54 which can include a beam expander 57 which can comprise an attenuator 56 and an interference filter 58 to control the signal in the optical feedback loop. Output port 30 of coupler 24 can be coupled to an optical transmission line for carrying the amplified optical signals to a remote location.

The uncoupled ports of the couplers, port 28 of coupler 24; port 52 of coupler 36; and, port 44 of coupler 34 can be immersed in oil to prevent undesired reflections of optical signals.

In operation, the amplified spontaneous emission from the output signal of the erbium-doped fiber amplifier 10 is filtered to pass a selected frequency, is then attenuated in the beam expander, and is then fed back to the input of the erbium-doped fiber amplifier where it is reamplified. Thus, the fiber amplifier is connected in ring-laser configuration. Lasing conditions are controlled by the wavelength of the feedback signal and the attenuation in the feedback loop. In this invention, the signal gain at any wavelength is independent of the input power of all of the optical channels. When the total signal input power increases, the power in the feedback loop automatically decreased to provide automatic compensation. Thus, the gain of all signal channels are maintained at a constant value provided that the round trip gain in the feedback loop is above unity. The signal in the feedback loop is said to have a round trip gain which is above unity when the magnitude of the feedback signal in the feedback loop is greater than the magnitude of the signal initially fed to the fiber amplifier.

Referring to FIG. 1, the erbium doped fiber amplifier is pumped by a high power laser diode at 1.48 μm. Pump and signal are input to the amplifier through a wavelength selective coupler. A wavelength selective coupler at the input of the fiber amplifier is used to assure optimum coupling of the signal and pump wavelength to the fiber amplifier. The signal at output port 32 of output coupler 24 is attenuated and filtered in beam expander 57, multiplexed with two separated signal channels via couplers 36, 34, and then applied to the input of the erbium doped fiber amplifier 10 via wavelength selective coupler 14. In the invention, interference filter 58 selects a wavelength of the amplified spontaneous emission signal from the output signal of the erbium doped fiber amplifier as the feedback signal. In operation, it has been found that the gains of all of the optical channels are maintained at a constant value when the output and input of one channel are coupled optically by the feedback loop provided the round trip gain in the feedback loop is above unity. If desired, the structure of FIG. 1 can be modified by having the two input signals on a common line thus eliminating coupler 36, substituting wavelength selective couplers for the 3 dB couplers 24 and 34 and eliminating the beam expander 57. This embodiment is more fully illustrated in FIG. 8.

Figure 2:
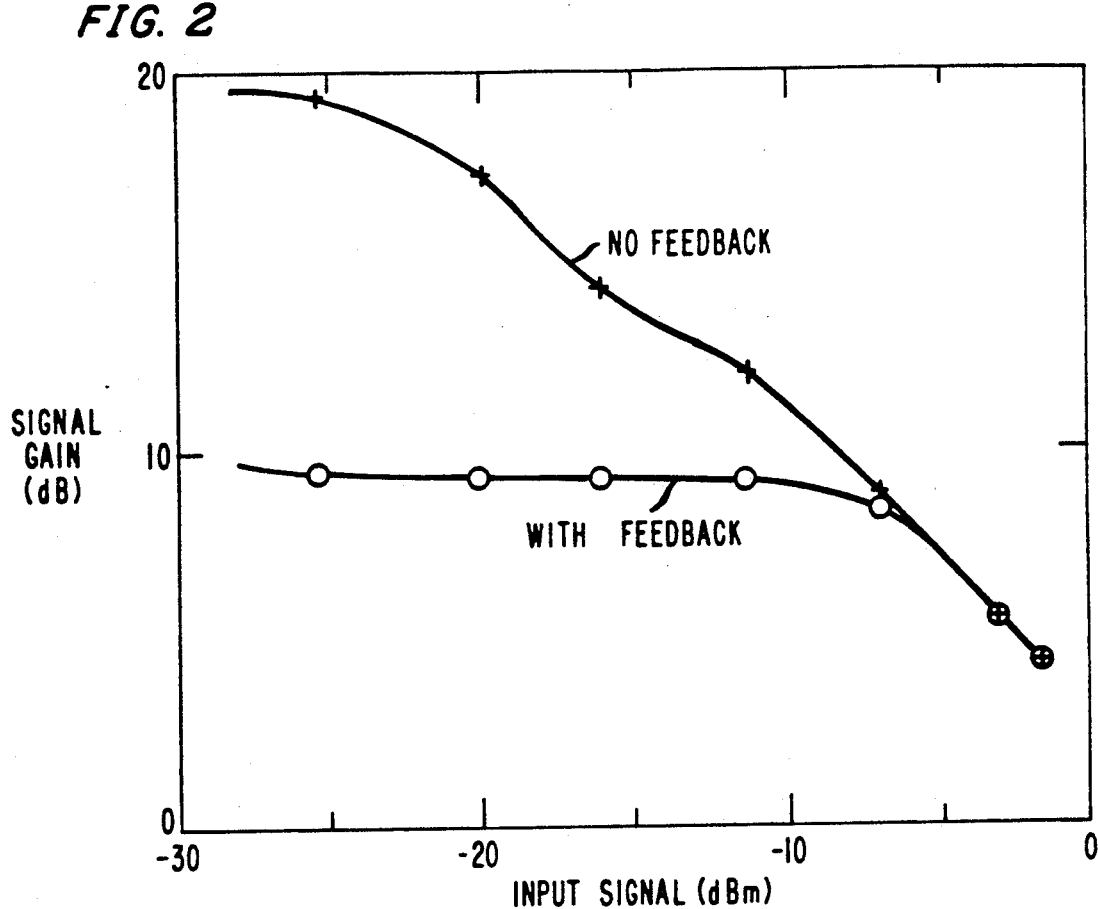
FIG. 2 illustrates a plot of the dc gain of a single channel vs. signal input power with and without a feedback loop signal.
Figure 3:
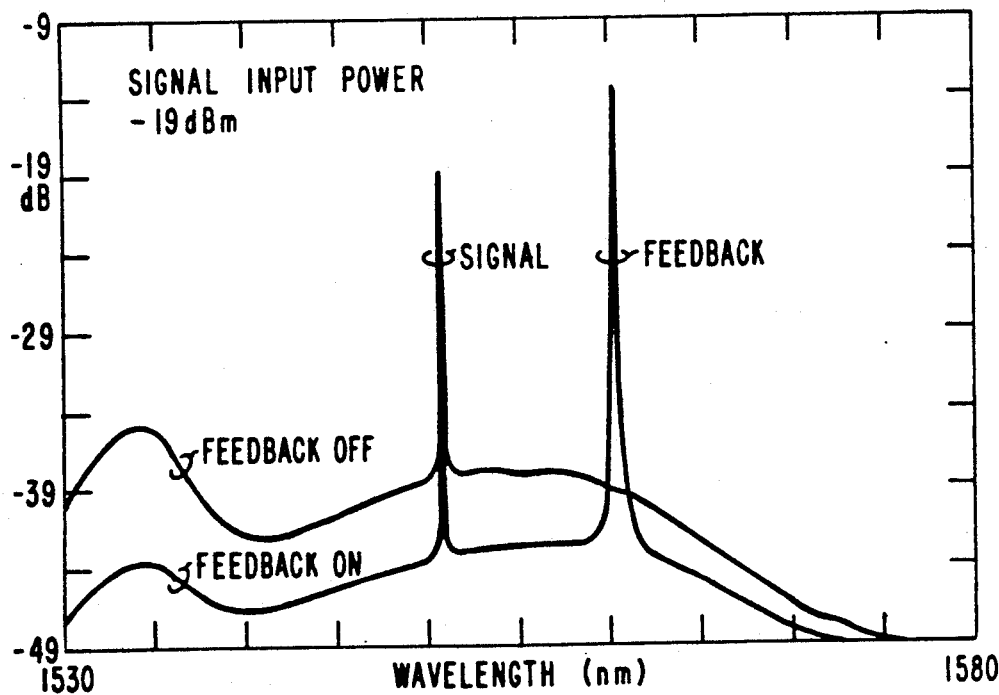
Figure 4:
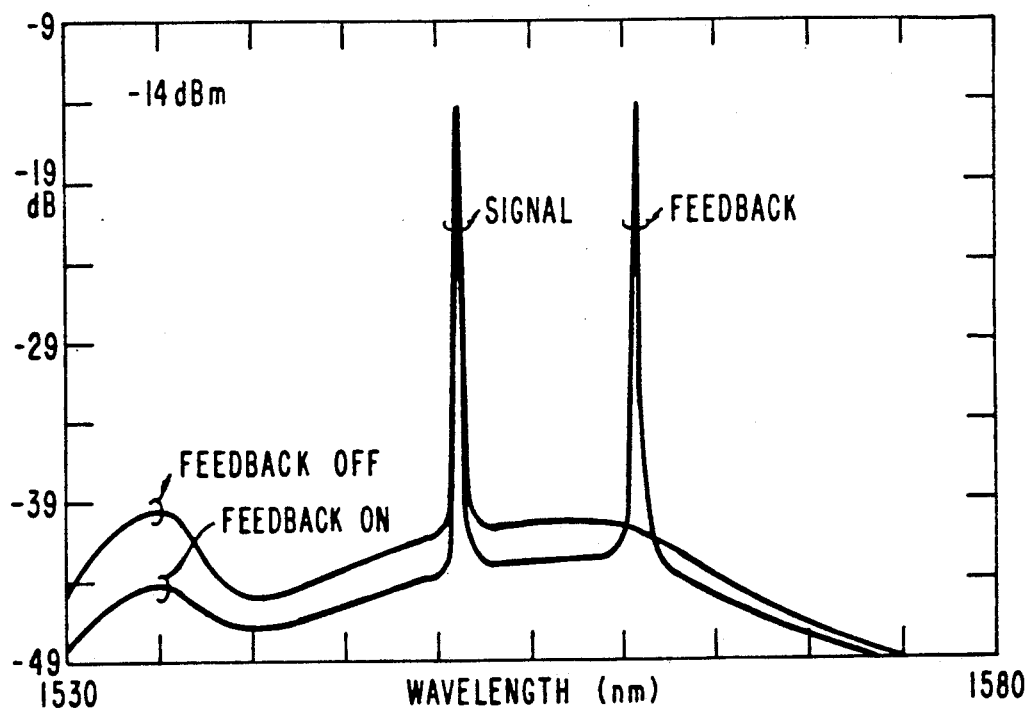
Figure 5:
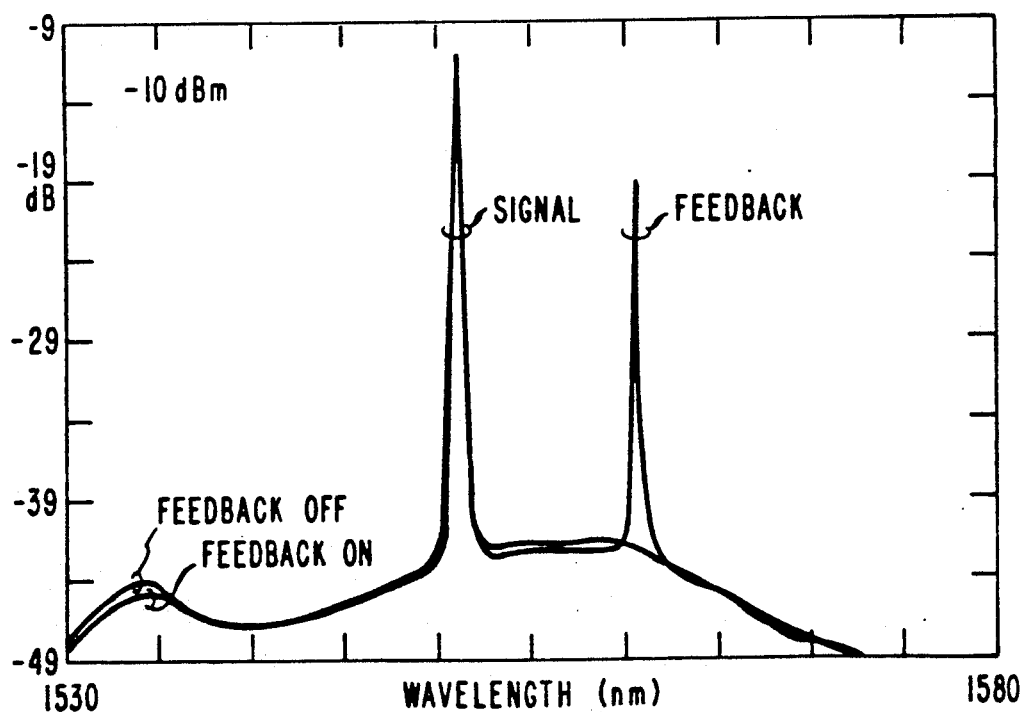

Referring to FIG. 2, there is illustrated a plot of the dc gain of a single channel vs. signal input power with and without the feedback loop signal. The upper curve is a plot of the signal gain vs. signal input power with no feedback; and the lower curve is a plot of the signal gain vs. signal input power with feedback. Note, the feedback loop stabilizes the gain up to about −10 dBm of signal input power. It is our understanding that, above this level the round trip gain of the feedback signal is less than unity and that a further increase of signal input cannot be compensated with a decrease of power of the feedback channel. Clearly, the attenuation in the feedback channel can be adjusted to stabilized the gain at any desired level. FIGS. 3, 4, and 5 illustrate plots of three different output spectra for different levels of signal input power with the feedback loop being turned on and off. From these figures it can be seen that the disclosed gain control is effective over a wide spectral range as evidenced by the substantially identical ASE curves for different signal input powers when the feedback loop is turned on. The transfer of power to the feedback loop which occurs when the input power is reduced can also be observed from these FIGS.

Figure 6:
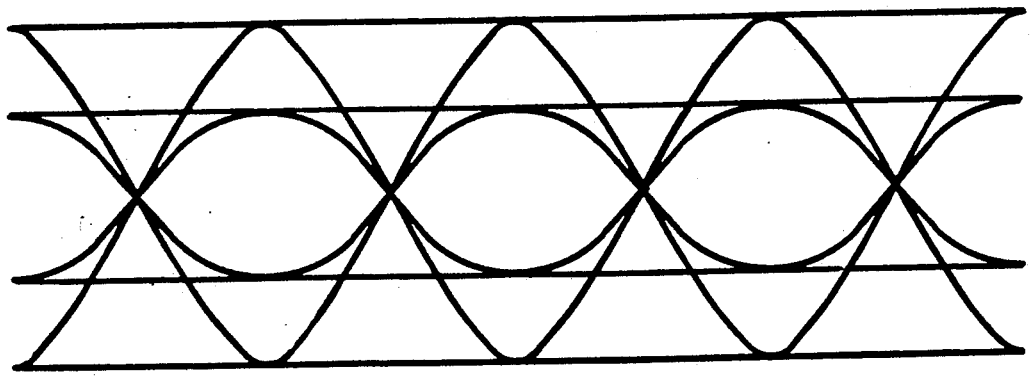
FIG. 6 illustrates the eye pattern rate of the structure of FIG. 1 when there is no feedbacks.
Figure 7:
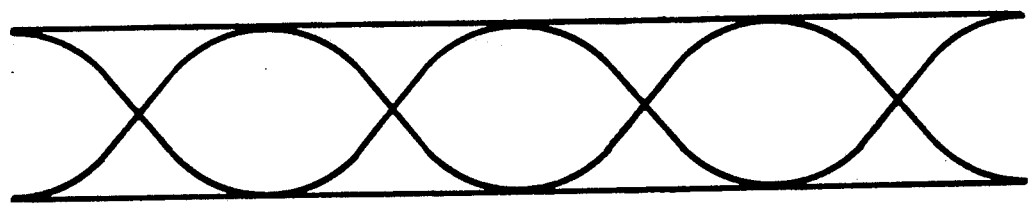
FIG. 7 illustrates the eye pattern rate of the structure of FIG. 1 when there is feedback; and, FIG. 8 illustrates a preferred embodiment of structure in accordance with the principles of the invention.

To illustrate the operation of the invention, two channels of approximately equal power are input to the erbium-doped fiber amplifier. Referring to FIG. 1, a first signal of 300 Mb/s at a wavelength of λ=1.52 μm is applied to input port 38 of coupler 34; and a second signal simulating the random power fluctuations in a packet switching network having a wavelength of λ=1.54 μm and being turned on and off at a 100 Mz repetiton rate is applied to input port 46 of coupler 36. FIG. 6 illustrates the eye pattern with feed back absent; and, FIG. 7 illustrates the eye pattern with feedback. The eye pattern without the feedback (FIG. 6) shows a large eye which corresponds to the high gain mode when the second signal is not present; and a small eye which corresponds to the low gain mode when the second signal is present. Clearly, as is illustrated in FIG. 7, the feedback signal eliminates the large eye.

Figure 8:
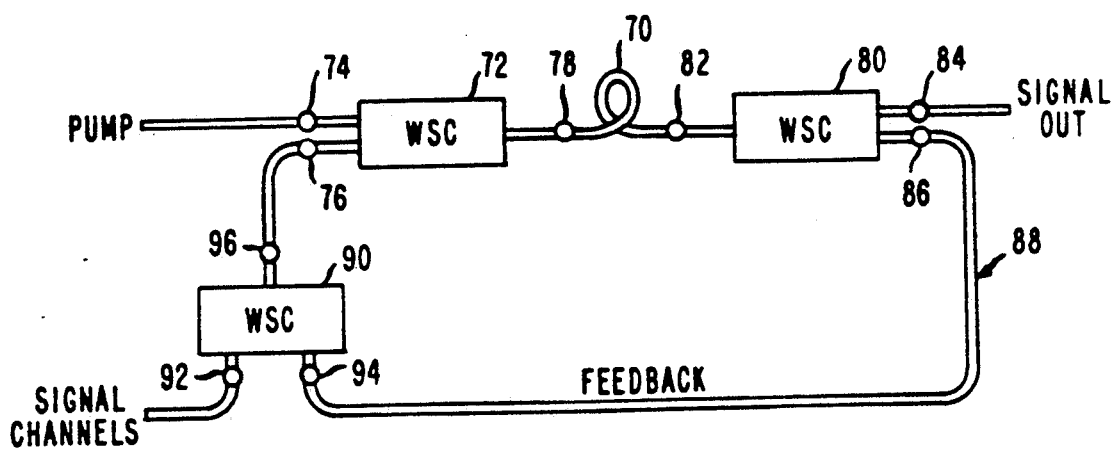

Referring to FIG. 8, there is illustrated a preferred embodiment of the invention. An erbium-doped fiber amplifier 70 is coupled to an input wavelength selective coupler 72 having input ports 74, 76 and output 78; and, to an output wavelength selective coupler 80 having input port 82 and output ports 84, 86. A third wavelength selective coupler 90 having input ports 92, 94 and output port 96 is coupled to pass at least two division multiplexed channels received on input port 92 to input port 76. An optical feedback loop 88 is coupled between output port 86 of coupler 80 and input port 76 of coupler 72 via input port 94 and output port 96 of coupler 90. Output port 84 of coupler 80 can be connected to an optical fiber for transmitting an optical signal from the fiber amplifier 70 to a remotely located receiver. In this embodiment, it is to be noted that the 3 dB coupers of FIG.1 have been replaced with wavelength selective couplers; and that the interference filter of FIG. 1 is no longer required.

I claim:
1. An fiber amplifier comprising an optical fiber doped with a rare earth element, a pump means coupled to pump said doped optical fiber, an input port adapted to couple signals to said optical fiber, an optical feedback loop interposed between the output of said doped optical fiber and the input port of said doped optical fiber, wavelength selective means coupled to said optical feedback loop to pass a signal having a frequency other than the frequency of the pump means and the frequency of the signals applied to said input port, and an output port coupled to receive the signal amplified by said doped optical fiber.

2. The fiber amplifier of claim 1 wherein said doped optical fiber is doped with erbium.

3. The fiber amplifier of claim 2 wherein said wavelength selective means comprises an interference filter.

4. The fiber amplifier of claim 2 wherein said wavelength selective means comprises an interference filter and an attenuator.

5. The fiber amplifier of claim 2 wherein said wavelength selective means comprises a wavelength selective coupler.

6. The fiber amplifier of claim 2 further comprising a wavelength selective coupler for coupling signals from said pump means, said feedback loop, and said input port to said doped optical fiber.

7. The fiber amplifier of claim 4 further comprising a first 3 dB coupler adapted to couple said optical feedback loop to the output of said doped optical fiber.

8. The fiber amplifier of claim 7 further comprising a wavelength selective coupler for coupling signals from said means and said feedback loop to said doped optical fiber.

9. The fiber amplifier of claim 1 wherein said wavelength selective means is adapted to restrict the signal passed by said feedback loop to an amplified spontaneous emission wavelength.

* * * * *